United States Patent [19]

Ida et al.

[11] Patent Number: 5,091,951
[45] Date of Patent: Feb. 25, 1992

[54] AUDIO SIGNAL DATA PROCESSING SYSTEM

[75] Inventors: Kazunaga Ida; Makio Yamaki; Yukio Matsumoto; Hiroyuki Ishihara, all of Tokyo; Toshiyuki Naoe; Hideyuki Terauchi, both of Yamanashi, all of Japan

[73] Assignee: Pioneer Electronic Corporation, Tokyo, Japan

[21] Appl. No.: 486,866

[22] Filed: Mar. 1, 1990

[30] Foreign Application Priority Data

Jun. 26, 1989 [JP] Japan .................................. 1-163322
Jun. 26, 1989 [JP] Japan .................................. 1-163325
Jun. 26, 1989 [JP] Japan .................................. 1-163328

[51] Int. Cl.$^5$ .............................................. H03G 3/00
[52] U.S. Cl. .......................................... 381/63; 84/630
[58] Field of Search ................. 84/603, 607, 608, 630; 381/61, 63

[56] References Cited

FOREIGN PATENT DOCUMENTS 64-72615 3/1989 Japan .

Primary Examiner—Forester W. Isen
Attorney, Agent, or Firm—Foley & Lardner

[57] ABSTRACT

An audio signal data processing system includes first and second processing devices for processing audio signal data, the first and second processing device having input and output ports of at least two channels, and a control device for controlling the operation of the first and second processing device. The input audio signal data is supplied to the input port of one channel of each of the first and second processing devices, and output data from the output port of said one channel of said first processing device is supplied to the input port of the other channel of the second processing device, and output audio signl data are obtained at each output port of both channels of the second processing device. With this arrangement, one of the cascade processing and the parallel processing can be selectively performed without using a change-over switch provided outside the system.

5 Claims, 8 Drawing Sheets

| STEP | FIRST PROCESSING INSTRUCTION | SECOND PROCESSING INSTRUCTION | COEFFICIENT DATA |
|---|---|---|---|
| 1 | MOV LIN1,B | | $D_1$ |
| 2 | MOV DRAM1($01),B | | $D_2$ |
| 3 | | MLT D1 | $D_3$ |
| 4 | | MSM D1,D1 | $D_3$ |
| 5 | | MSM D1,D1 | $D_3$ |
| 6 | MOV D1,(DRAM($00),B) | | $D_4$ |
| 7 | MOV DRAM($02),B | | $D_5$ |
| 8 | | MLT D1 | $D_6$ |
| 9 | | MSM D1,D1 | $D_6$ |

| STEP | FIRST PROCESSING INSTRUCTION | SECOND PROCESSING INSTRUCTION |
|---|---|---|
| 1 | MOV  LIN1, B | |
| 2 | MOV  DRAM1($01), B | |
| 3 | | MLT  D1 |
| 4 | MOV  DRAM1($03), B | MSM  D1, D2 |
| 5 | MOV  D2, DRAM1($00) | MSM  D2, D2 |
| 6 | MOV  D2, LO1 | MSM  D1, D1 |
| 7 | MOV  D1, DRAM1($02) | MSM  D1, D1 |
| 8 | MOV  D1, LO2 | |

AUDIO SIGNAL DATA PROCESSING SYSTEM

BACKGROUND OF THE INVENTION

1. Field of the Invention

The present invention relates to an audio signal data processing system.

2. Description of Background Information

There are known audio signal data processing systems capable of controlling the sound field by which a concert-hall (or theater) acoustics with reverberation sounds and the presence, for example, are created in a listening room or in an automobile. An example of the audio data processing system is disclosed in Japanese Patent Application Laid Open No. 64-72615. In such audio signal processing systems, a DSP (digital signal processor) is provided for controlling the sound field by digitally processing an audio signal from an audio signal source such as a tuner. The DSP is constructed so that operating processes such as the four rules of arithmetic can be repeatedly performed at high speed.

A plurality of the DSPs may be used simultaneously so that either a cascade processing or a parallel processing is selectively performed. For this type of processing, it has been conventionally necessary to provide a change-over switch outside the DSP, such as the change-over switch 50 shown in FIG. 1. Specifically, an input signal data is supplied to an input port IN of a first DSP 51 and one of two stationary contacts of the change-over switch 50, and output data from an output port of the first DSP 51 is supplied to a first D/A converter (not shown) and the other stationary contact of the change-over switch 50. Data selected by the changeover switch 50 is supplied to an input port IN of a second DSP 52, and output data of the second DSP 52 is supplied to a second D/A converter (not shown) through its output port OUT. With this structure, when the change-over switch 50 is switched over to select the output data of the first DSP 51, the cascade processing is performed. When on the other hand, the change-over switch is switched over to select the input signal data, the parallel processing is performed.

As described above, for selectively performing the cascade processing and the parallel processing, there conventionally have been a necessity of providing a change-over switch and also a problem that the circuit construction becomes complicated for dealing with a time error generated between signal data respectively issued from each DSP in the case of the cascade processing. This is because timing signals must be separately prepared for the digital to analog conversion of each signal data in order to eliminate the time error.

The DSPs are normally provided with multiplying means for multiplying coefficient data to the audio signal data. The audio signal data is stored in a data memory, and the audio signal is read-out in accordance with a predetermined program, and supplied to the multiplying means. The coefficient data, on the other hand, is stored in a coefficient memory, and sequentially read-out from the coefficient memory at executing timings of the above-described program, and in turn supplied to the multiplying means. When the data are supplied, the multiplying means executes multiplying operations according to the supplied data, and product data obtained by the multiplying operations are received by output means including an accumulator when required.

Conventionally, the systems are configured so that, during a period in which the output means does not accept the product data, coefficient data having an initial value (1, for example) is read-out from the coefficient memory. However, when the data supplied from any one of the memories changes, it in turn causes on-off operations of gate circuits constituting the multiplying means. Thus, there has been a problem that the power consumption of the DSP increases during such periods.

Furthermore, the DSP is provided with an accumulator for holding a result of operation of the arithmetic means, and data held in the accumulator is again supplied to the arithmetic means for the next accumulation operation, so that the accumulation operation is performed in the arithmetic means. With this structure, data is transferred in the DSP between memories or from a memory to the arithmetic means in accordance with a predetermined program, so that the arithmetic operation of signal data is repeatedly performed at high speed.

However, with conventional audio signal data processing systems described above, there has been a problem that the number of program steps increases when a complex operating process is to be performed.

OBJECT AND SUMMARY OF THE INVENTION

An objective of the present invention is to provide an audio signal data processing system which selectively performs the cascade processing and parallel processing with a simple construction so that the necessity of providing a change-over switch or a timing adjusting circuit outside the DSP is eliminated.

Another objective of the present invention is to provide an audio data processing system which is configured to reduce the power consumption when it does not need the product data of results of operations by the multiplying means.

A further objective of the present invention is to provide an audio signal data processing system in which the number of program steps can be decreased as compared with conventional systems even when a complex operating process is performed.

According to a first aspect of the present invention, the audio signal data processing system comprises first and second processing means respectively for processing audio signal data and having input and output ports of at least two channels, and control means for controlling the operation of the first and second processing means, wherein an input audio signal data is supplied to the input port of one channel of each of the first and second processing means, and output data from the output port of the one channel of the first processing means is supplied to the input port of the other channel of the second processing means, and output audio signal data are obtained at each output port of both channels of the second processing means.

According to another aspect of the present invention, the audio signal data processing system comprises input means for sequentially supplying audio signal data, data memory control means for writing and reading-out the audio signal data into and from a data memory, a coefficient memory for storing coefficient data, coefficient memory control means for sequentially reading-out the coefficient data from the coefficient memory, multiplying means for multiplying the read-out audio signal data with the coefficient data, and output means for accepting product data obtained by a multiplying operation of the multiplying means and forwarding audio signal data corresponding to the product data in accordance with reading operations of the data memory control means and coefficient memory control means, wherein the same coefficient data is stored in locations of said coefficient memory from which data is read-out when the product data is not accepted by the output means.

According to a further aspect of the present invention, the audio signal data processing system comprises input means for sequentially supplying audio signal data, data memory control means for writing and reading-out the audio signal data into and from a data memory, arithmetic means for multiplying the read-out audio signal data with predetermined coefficient data, holding means for accepting accumulation data as a result of operation of said arithmetic means and for holding said accumulation data, relaying means for supplying data held in said holding means to said arithmetic means for a next accumulating operation, and output means for forwarding signal data corresponding to the data held in the holding means, wherein the holding means includes a plurality of accumulators for holding data and selecting means for supplying a present value of said accumulation data to said plurality of accumulators except at least one of accumulators and supplying a next value of said accumulation data to said at least one of the accumulators, and wherein said relaying means supplies data held in said plurality of accumulators other than said at least one of accumulators to said arithmetic means.

DETAILED DESCRIPTION OF PREFERRED EMBODIMENTS

The embodiments of the present invention will be explained with reference to the accompanying drawings.

Figure 2:
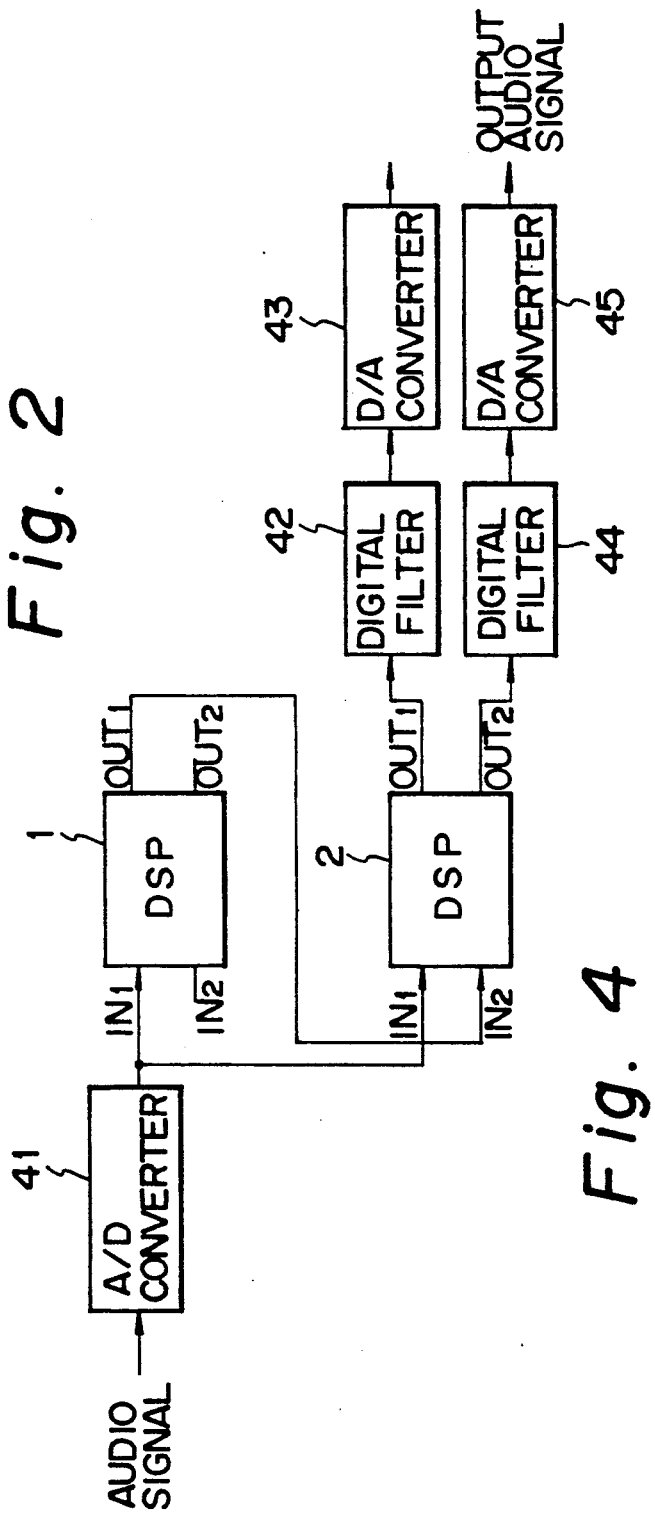
FIG. 2 is a block diagram showing an embodiment of the present invention.
Figure 3:
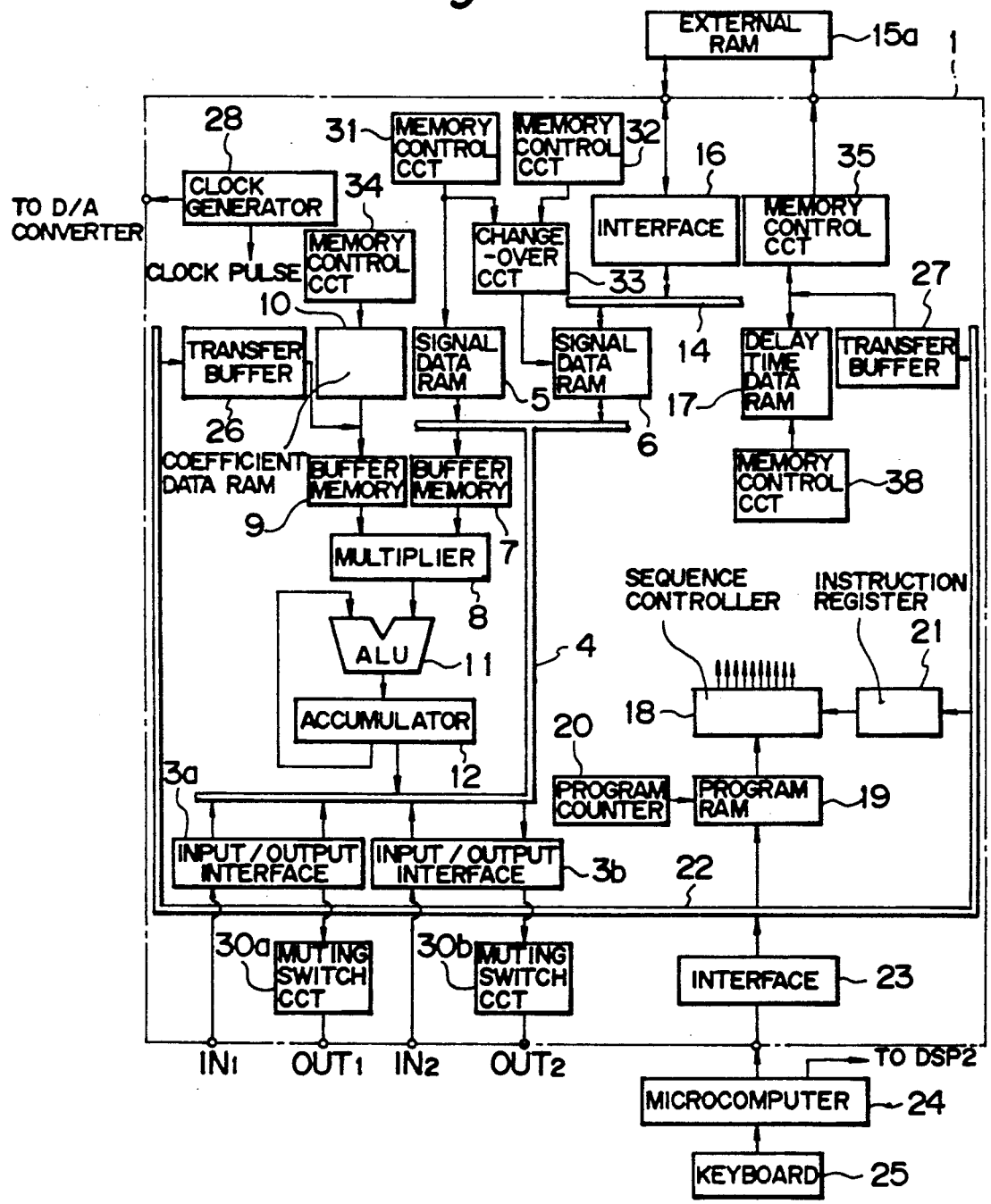
FIG. 3 is a block diagram showing the DSP in the system of FIG. 2.

In the audio signal data processing system shown in FIGS. 2 and 3 as an embodiment of the present invention, DSPs 1 and 2 having the same construction are provided as the first and second processing means, input audio signals are supplied to first input ports $IN_1$ of the DSPs 1 and 2 through an A/D converter 41. A first output port $OUT_1$ of the DSP 1 is connected to an input port $IN_2$ of the DSP 2. A D/A converter 43 is connected to an output port $OUT_1$ of the DSP 2 through a digital filter 42. Similarly, a D/A converter 45 is connected to an output port $OUT_2$ of the DSP 2 through a digital filter 44.

In the DSP 1, the input signal data from the first input port $IN_1$ is supplied to an input/output interface 3a as shown in FIG. 3. A first data bus 4 is connected to the input/output interface 3a. Similarly, the input signal data from the second input port $IN_2$ is supplied to an input/output interface 3b which in turn is connected to the first data bus 4. As data memory for storing the audio signal data, two signal data RAMs 5 and 6 are connected to the first data bus 4. A buffer memory 7 is further connected to the data bus 4, and the output-data of the buffer memory 7 is connected to one of two inputs of a multiplier 8. A buffer memory 9 for holding the coefficient data is connected to the other input of the multiplier 8. A coefficient data RAM 10 for storing a plurality of coefficient data is further connected to the buffer memory 9. An ALU (arithmetic logic unit) 11 is provided for executing operations such as the accumulation of the calculation output of the multiplier 8 which is supplied to one of two inputs of the ALU 11. An accumulator 12 is provided for holding the calculation output of the ALU 11, and its output is connected to the other input of the ALU 11. The output of the accumulator 12 is connected to the data bus 4.

A memory control circuit 31 is connected to the signal data RAM 5. The memory control circuit 31 generates a control signal for controlling the writing of data into designated address of the RAM 5 and reading of data from designated address of the RAM 5. A memory control circuit 32 like the memory control circuit 31 is connected to the signal data RAM 6 via a change-over circuit 33. The change-over circuit 33 is configured to switch its operation between writing data into the designated address of the RAM 6 and reading-out data from the designated address in response to the control signal from the memory control circuit 31. A memory control circuit 34 like the memory control circuit 31 is connected to the coefficient data RAM 10.

Figure 4:
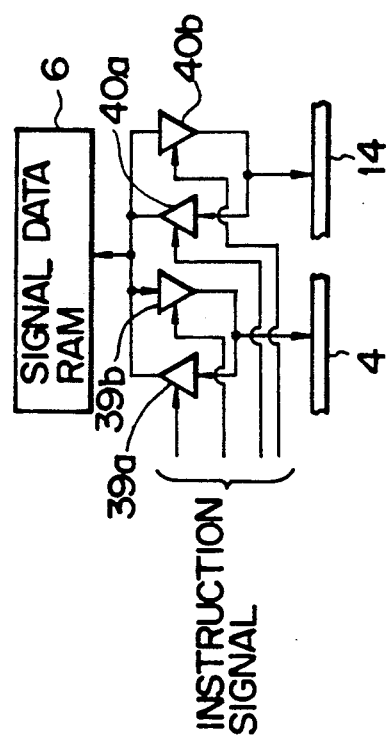
FIG. 4 is a circuit diagram particularly showing a part of the system shown in FIG. 1.

The signal data RAM 6 is also connected to a second data bus 14 which is independent from the first data bus 4. Specifically, there are provided a couple of tri-state buffers 39a and 39b between the signal data RAM 6 and the first data bus 4 and a couple of tri-state buffers 40a and 40b between the signal data RAM 6 and the second data bus 14, as illustrated in FIG. 4. The buffers 39a, 39b, 40a and 40b are respectively on-off controlled in response to instruction signals from a sequence controller 18 which will be described later. For writing the signal data from the first data bus 4 into the RAM 6, the buffer 39a turns on, and the buffer 39b turns on when the signal data is read-out from the RAM 6 to the first data bus 4. Similarly, for writing the signal data from the data bus 14 into the RAM 6, the buffer 40a turns on, and the buffer 40b turns on when the signal data is readout from the RAM 6 to the second data bus 14. Thus, one of the tri-state buffers 39a, 39b, 40a, and 40b, which are controlled by instruction signals, is always turned on.

An interface 16 for the data transfer to and from an external RAM 15 is connected to the data bus 14. The external RAM 15, which is a memory for the delay operation, is provided for producing a delay signal data of the audio signal data, and is capable of producing a signal data whose delay time is dependent on the memory capacity. A memory control circuit 35 is provided for designating writing and reading addresses of the RAM 15, and a delay time data RAM 17 is connected to the memory control circuit 35. The operations of writing and reading of the delay time data into and from the RAM 17 are controlled by a memory control circuit 38.

Operations of the interfaces 3a, 3b and 16, multiplier 8, buffer memories 7 and 9, ALU 11, accumulator 12, memory control circuits 31, 32, 34, 35 and 38, and change-over circuit 33 are controlled by the sequence controller 18. A program RAM 19 is connected to the sequence controller 18, and the sequence controller 18 operates in accordance with the program stored in the program RAM 19. A program counter 20 is connected to the program RAM 19, and every time the count value of the program counter 20 is incremented, an instruction code of the step corresponding to the new count value is read-out from the program RAM 19 and supplied to the sequence controller 18. To the sequence controller 18, also a register 21 is connected for holding a plurality of commands from a microcomputer 24 described later.

The program RAM 19 and the register 21 are respectively connected to a main bus 22. The microcomputer 24 is connected to the main bus 22 via an interface 23. To the main bus 22, transfer buffers 26 and 27 are connected. The transfer buffer 26 temporarily holds the coefficient data supplied from the microcomputer 24 for storing it in the RAM 10. The transfer buffer 27 temporarily holds the delay time data supplied from the microcomputer 24 for storing it in the RAM 17.

The microcomputer 24 is comprised of a microprocessor, RAM, ROM, and an interface (not shown). A keyboard is connected to the microcomputer 24. The keyboard 25 is provided with a plurality of keys such as a plurality of mode keys for respectively designating a sound field mode, e.g. "hall 1", "hall 2" having different sound field characteristics, a frequency band setting key for controlling a graphic equalizer function, a level adjusting key, and a muting key (not shown). In the ROM of the microcomputer 24, various programs and data are previously written. Those programs and data are, namely, a plurality of sequence control programs to be processed by the sequence controller 18, in addition to a DSP control program which is processed by the microcomputer 24 itself, a plurality of coefficient data groups of initial reflective sound level, and a plurality of coefficient data groups for the first to fourth filters, both to be supplied to the RAM 10, and a plurality of delay time data groups to be supplied to the RAM 17 for setting the reading address.

In the DSP 1, a clock generator 28 is provided, and clock pulses are supplied from the clock generator 28 to the sequence controller 18 and the program counter 20. The clock pulses generated by the clock generator 28 are also used as the timing signal of the A/D converter 41.

The audio signal data issued from the interface 3a is supplied to a first output port $OUT_1$ through a muting switch circuit 30a. The audio signal data issued from the interface 3b is supplied to a second output port $OUT_2$ through a muting switch circuit 30b. The on-off control of the muting switch circuits 30a and 30b is performed by instruction signals issued from the sequence controller 18.

The DSP 2 is constructed in the same manner as the DSP 1. The interface 23 of the DSP 2 is connected to the microcomputer 24, and an external RAM like the external RAM 15a is also connected to the DSP 2.

In the structure of the DSPs 1 and 2 described above, the sequence controller 18 generates various instruction signals in addition to the instruction signals for the tristate buffers 39a through 40b and the on-off control of the muting switch circuit 30a. Those instruction signals are, namely, instruction signal for transferring the coefficient data group held in the transfer buffer 26 to the RAM 10, instruction signal for transferring the address data group held in the transfer buffer 27 to the RAM 17, transfer instruction signal for transferring the audio signal data from the interface 3 to the designated address of the signal data RAMs 5 and 6, instruction signal for reading-out the signal data from the designated address of the signal data RAM 5 and 6 and transferring it to the buffer memory 7, instruction signal for reading-out the coefficient data from the designated address of the RAM 10 and transferring it to the buffer memory 9, instruction signal for instructing various operations of the ALU 11, transfer instruction signal for transferring the signal data held in the accumulator 12 to the designated addresses of the RAMs 5 and 6 or to the buffer 7, transfer instruction signal for transferring data from the designated address of the signal data RAM 6 to the designated writing address of the external RAM 15a, transfer instruction signal for transferring data from the designated delay address of the external RAM 15a to the designated address of the signal data RAM 6, and reset instruction signal for initializing the RAMs 5 and 6 and the external RAM 15a. These instruction signals are generated at appropriate timings according to commands from the microcomputer 24 or the program stored in the RAM 19. Since the commands from the microcomputer 24 is held in the command resister 21, the sequence controller 18 generates an instruction signal corresponding to the command from the microcomputer 24 by an interruption operation while monitoring the contents of the command register 21 during its operation according to the program. The command held in the command register 21 is canceled by the sequence controller 18 for example, when the corresponding instruction signal is generated.

Figure 5:
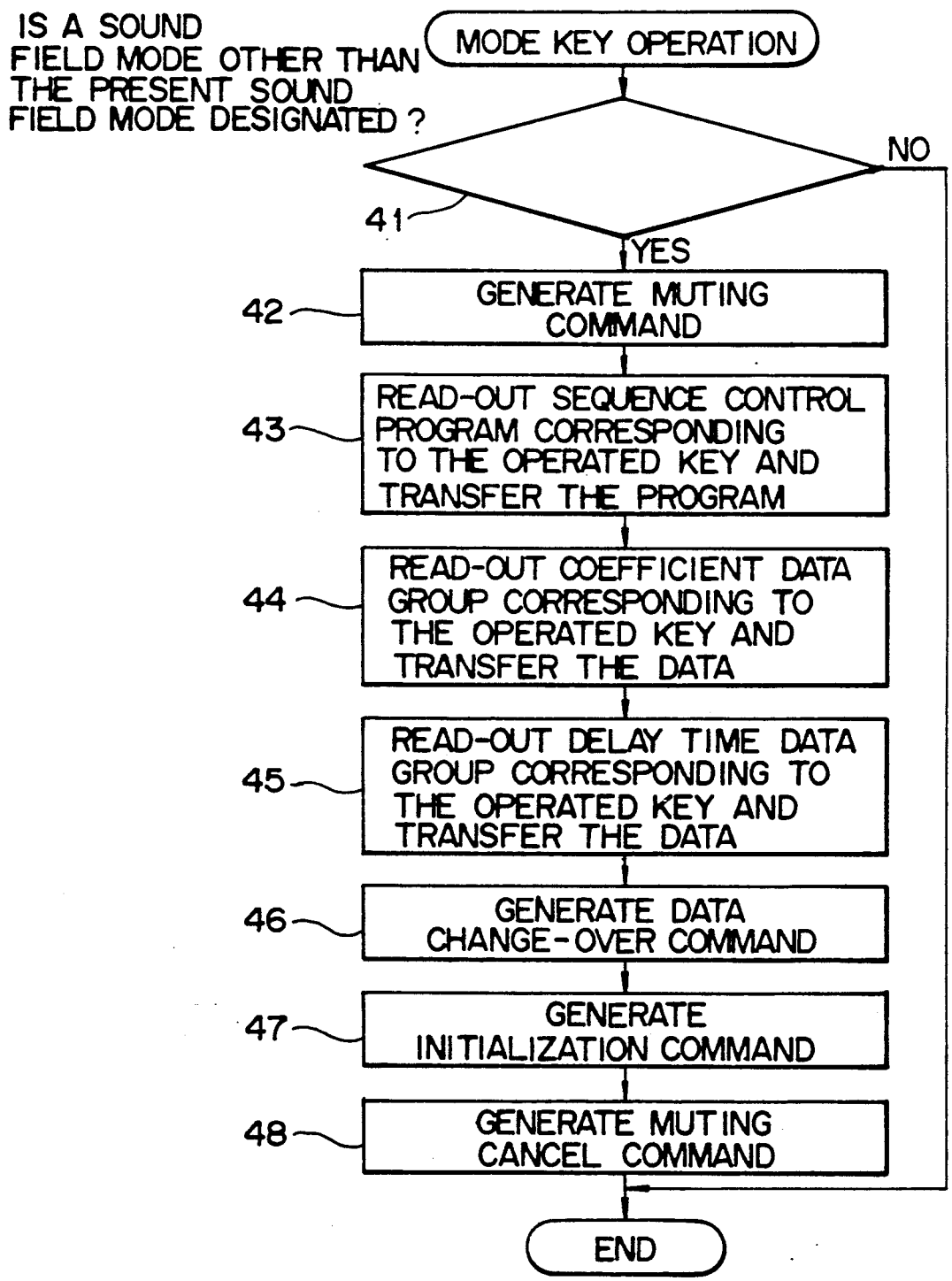
FIG. 5 is a flowchart showing the operation of a microcomputer in the system shown in FIG. 3.

When any one of the mode keys of the keyboard 25 is operated, as shown in FIG. 5 the microcomputer 24 judges whether or not the operated key is a key for designating a sound filed mode different from the sound field mode presently selected (step 41). When a sound field mode different from the present sound field mode is designated, the microcomputer 24 immediately supplies the muting control instruction to the sequence controllers 18 of the DSPs 1 and 2 in order to turn off the muting switch circuits 30a and 30b for placing the system in a muting state (step 42). Then the microcomputer reads a sequence control program corresponding to the operated key, a coefficient data group $a_1, a_2, \ldots a_n$, and a delay time data group $t_1, t_2, \ldots t_n$ from the ROM, and transfers them to the DSP 2 (steps 43 through 45). The sequence control program is transferred to the RAM 19 through the interface 23 and the main bus 22 of the DSPs 1 and 2, and written in the RAM 19 by a memory writing control circuit (not shown). The coefficient data group is transferred to the transfer buffer 26 through the interface 23 and the main bus 22. The delay time data group is transferred to the transfer buffer 27 through the interface 23 and the main bus 22. After transferring the coefficient data and the delay time data to the transfer buffers 26 and 27 respectively, the microcomputer 24 issues a data change-over command to the sequence controllers 18 of the DSPs 1 and 2 (step 46). Furthermore, the microcomputer 24 issues an initialization command to the sequence controllers 18 (step 47). In response to the data change-over command, the sequence controller 18 issues a predetermined instruction signal to the memory control circuits 34 and 38, to write the coefficient data group transferred to the transfer buffer 26 into a predetermined area of the RAM 10 and to write the delay time data group transferred to the transfer buffer 27 into a predetermined area of the RAM 17. Furthermore, since the sequence controller 18 issues the above-mentioned reset instruction signal to the memory control circuits 31, 32, and 35 in response to the initialization command, a "0" is written into the whole memory areas of the RAMs 5 and 6, and the external RAM 15a by means of the memory control circuits 31, 32, and 35.

After the execution of the step 47, the microcomputer 24 issues a muting cancel command to the sequence controller 18, to turn-on the muting switch circuits 30a and 30b thereby canceling the muting state (step 48). More specifically, the muting switch circuits 30a and 30 are turned off only during a time period required for changing data or program in the RAM 10, 17 and 19 in order to switch from the presently selected sound field mode to another sound field mode. This function is provided for preventing the generation of noise signals by the change of data or program.

When the parallel processing is designated by an operation of the keyboard 25, the microcomputer 24 places first channels of the DSPs 1 and 2, i.e. a signal path between the input port $IN_1$ and the output port $OUT_1$, into a data processing state, and places second channels of the DSPs 1 and 2, i.e. a signal path between the input port $IN_2$ and the output port $OUT_2$, into a state of passing data. When, on the other hand, the cascade processing is designated by the operation of the keyboard 25, the microcomputer 24 puts the first channels of the DSPs 1 and 2 into the data processing state, and also puts the second channels of the DSPs 1 and 2 into the data processing state.

Then, the signal data processing operation within the DSP 1 will be explained. The input audio signal supplied to the A/D converter 41 is converted to an audio signal data group $d_1, d_2, \ldots d_n$ at each of sampling timings synchronized with clock pulses from the clock generator 28. The audio signal data group is supplied to the first data bus 4 via the interface 3a. The signal data group supplied to the data bus 4 is in turn supplied to the RAM 5 or 6, and stored therein.

The signal data written in the RAM 6 is sequentially transferred to an output register (not shown) in the interface 16 via the data bus 14, and from the output register further written into memory locations of the external RAM 15a designated by the writing address. The writing address is controlled by the memory control circuit 35, and one of a plurality of addresses whose number corresponds to the number of memory locations of the external RAM 15a is sequentially selected in a predetermined order each time the transferred signal data is supplied. In the external RAM 15a, the signal data in the memory location designated by the reading address is read-out, and transferred to an input register (not shown) in the interface 16. Since the delay time data stored in the RAM 17 is read-out by the memory control circuit 38 and supplied to the memory control circuit 35, the reading address is set according to the delay time data supplied to the memory control circuit 35, using the writing address as a reference. In other words, the interval between the timing of writing a signal data into the RAM 15a and the timing of reading the same signal data becomes a delay time designated by the delay time data. The signal data transferred to the input register in the interface 16 and held therein is in turn transferred to the signal data RAM 6 via the data bus 14. A delay audio signal data for controlling the sound field is produced by the transfer operation with the external RAM 15a described above.

The coefficient data read-out from the RAM 10 is supplied to the buffer memory 9 and held therein. At timings appropriately determined by the sequence controller 18, the signal data is transferred to the buffer memory 7 from the RAM 5 or 6, or the accumulator 12. Therefore, the multiplier 8 executes the multiplication between the signal data held in the buffer memory 7 and the coefficient data held in the buffer memory 9. In the case of computing a sum of products between a signal data group $d_1, d_2, \ldots d_n$ and the coefficient data group $\alpha_1, \alpha_2 \ldots \alpha_n$ for example, the following operations will be performed. At first, $d_1$ is held in the buffer memory 7 for transmission, $\alpha_1$ is held in the buffer memory 9 for transmission, $\alpha_1.d_1$ is calculated in the multiplier 8, and a "0" is added to $\alpha_1.d_1$ at the ALU 11. The result of this operation is held in the accumulator 12. Subsequently, $d_2$ is held in the buffer memory 7 for transmission, and $\alpha_2$ is held in the buffer memory 9 for transmission. At this time $\alpha_2.d_2$ is calculated in the multiplier 8, $\alpha_1.d_1$ is issued from the accumulator 12, and $\alpha_1.d_1 + \alpha_2.d_2$ is calculated in the ALU 11. By repeating these operations, $$\sum_{i=1}^{n} \alpha i \cdot di$$

is calculated.

$$\sum_{i=1}^{n} \alpha i \cdot di$$

is forwarded through the interface 3a.

In the above-description the processing operation for the first channel has been described. However, the same operation is performed for the second channel in the case of the cascade processing. Further, the data processing operation is performed in the similar manner in the DSP 2.

The data passing operation in the parallel processing is such that the signal data group issued from the interface 3b is supplied to the interface 3b through the data bus 4.

These operations are performed in response to instruction signals generated by the sequence controller 18 according to the sequence control program stored in the program RAM 19.

In the embodiment described above, the clock generator is provided in each of the DSPs. However, the system may be arranged such that the clock pulses from one clock generator are supplied to each of the DSPs and the D/A converters.

Furthermore, it is needless to mention that the input audio signal processed in the above-described apparatus may be either of a monaural signal or stereophonic audio signals.

Figure 1:
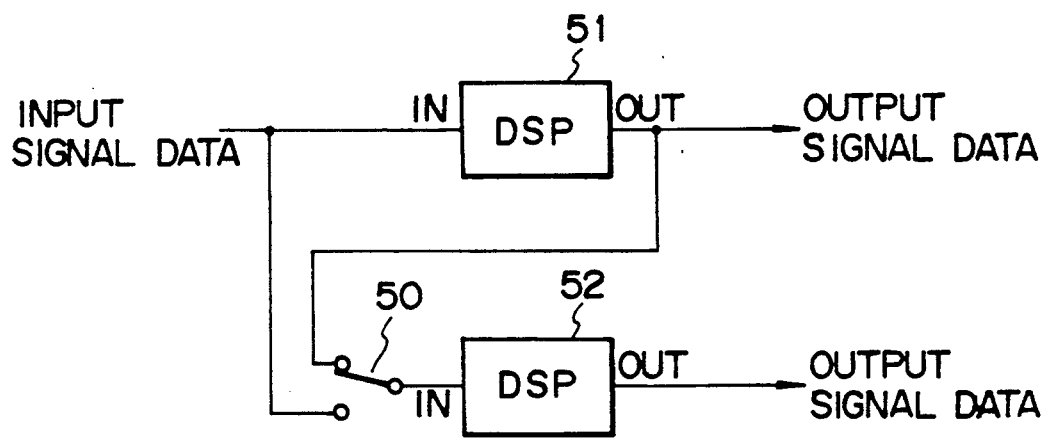
FIG. 1 is a block diagram showing a conventional audio signal data processing system.
Figure 6:
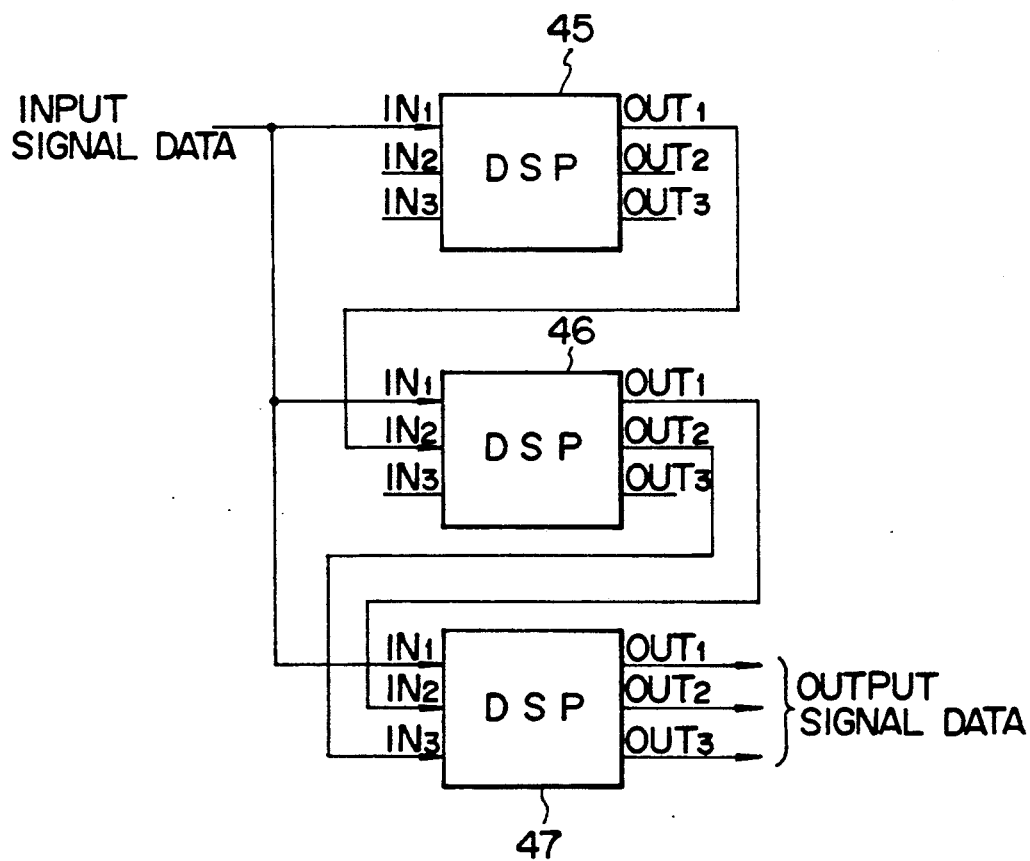
FIG. 6 is a block diagram showing another embodiment of the present invention.

FIG. 6 shows a circuit connection for selectively performing the parallel processing and the cascade processing by three DSPs 45 through 47. In this arrangement, the DSPs 45 through 47 respectively have three channels of input ports $IN_1$ through $IN_3$ and three channels of output ports $OUT_1$ through $OUT_3$. For performing the parallel processing, the first channel is placed into the data processing state, and the second and third channels are placed into the data passing state. For performing the cascade processing, on the other hand, the first through third channels are placed into the data processing state.

As specifically described in the foregoing, the first embodiment of the audio signal data processing system according to the present invention is configured such that the input audio signal data is supplied to input ports of one of channels in each of first and second processing means, the output data from an output port of the one of channels of the first processing means is supplied to an input port of the other channel of the second processing means, and the output audio signal data is obtained at output ports of both channels of the second processing means. Therefore, the cascade processing and the parallel processing can be selectively performed without using a change-over switch connected outside the processing means. Since the output signal data of each channel from the second processing means is forwarded as the processing output data in both of the cascade and parallel processing operations, generation of a timing error between signal data of different channels is prevented. This means that adjustment of timing during the conversion of the signal data to analog signals is made unnecessary so that the overall circuit construction can be simplified. Furthermore, in the case of operating the first and second processing means according to programs, there arises an advantageous effect that the same program can be commonly used in both of the first and second processing means.

Figure 7:
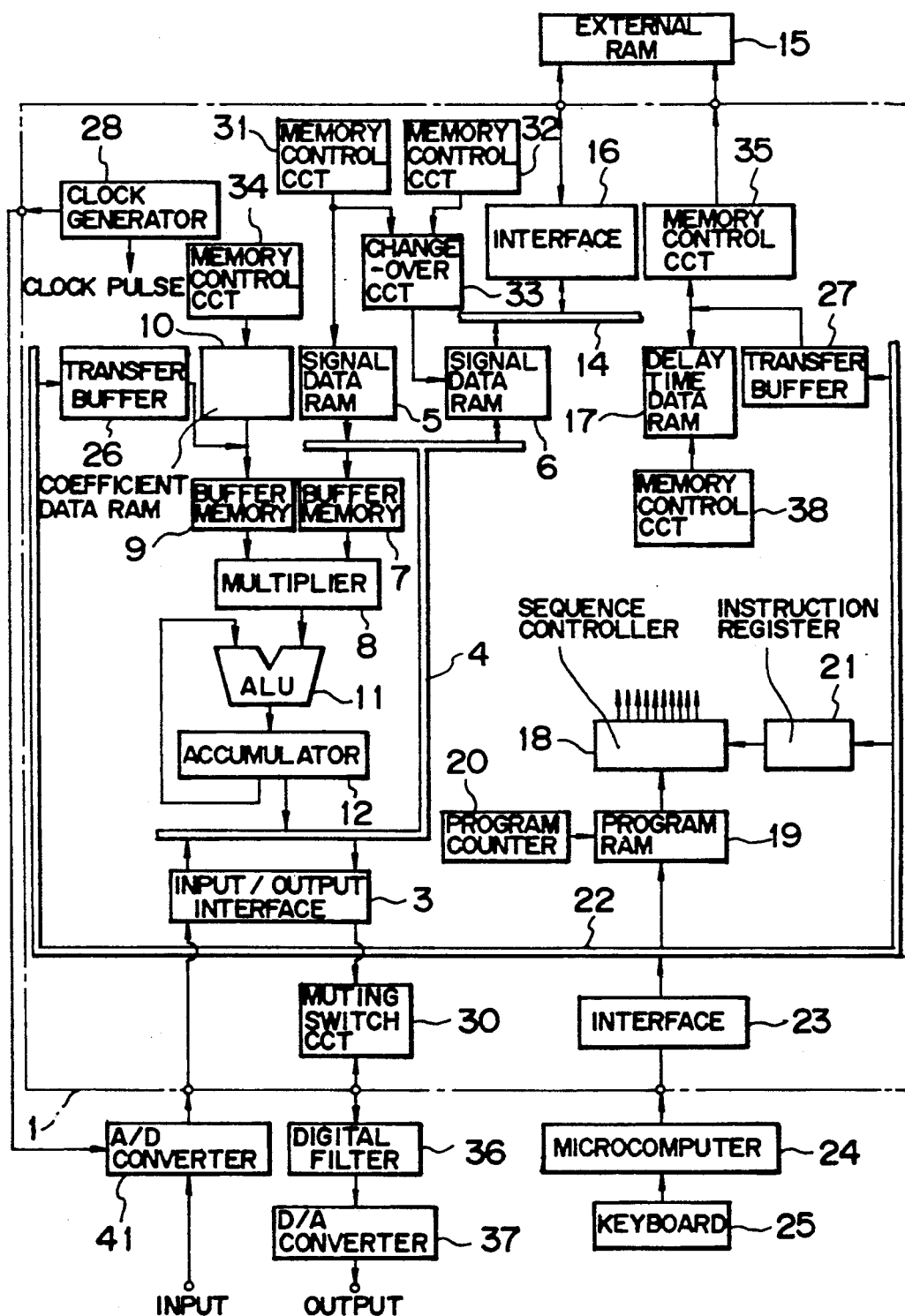
FIG. 7 is a block diagram showing a further embodiment of the present invention.

The another embodiment of the present invention will be described with reference to FIGS. 7 through 9 of the accompanying drawings. In this embodiment, the audio signal data processing system is as shown in FIG. 7 constructed substantially the same as the system shown in FIG. 3, and explanation of same elements and corresponding parts will not be repeated. In this embodiment, however, a single input/output interface 3 is connected to the data bus 4, and the input audio signal is supplied to the input/output interface 3 through the A/D converter 41. Further, the clock pulses from the clock generator 28 are supplied to the A/D converter 41. In addition, the microcomputer 24 in this embodiment also performs the operation shown in the flowchart of FIG. 5.

Figures 8, 9:
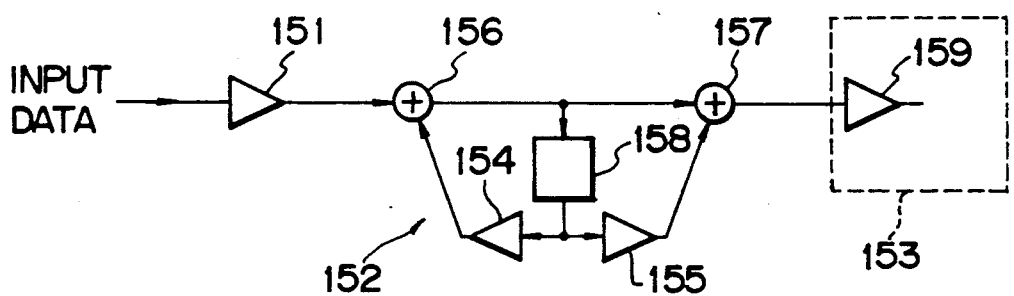
FIG. 8 is a circuit diagram showing processing operations of the system shown in FIG. 7.
FIG. 9 is a diagram showing a parallel processing instruction and coefficient data of each step for performing the operation of the circuit shown in FIG. 8.

This embodiment of the audio signal data processing system having the DSP 1 of the structure described above will be further described for a case in which a processing operation the same as that of a circuitry shown in FIG. 8 is performed.

In the circuitry shown in FIG. 8, input signal data is supplied to a next circuit 153 through a multiplier 151 for multiplying the coefficient and a standard type first-order IIR filter circuit 152. The first-order IIR filter circuit 152 comprises multipliers 154 and 155 for multiplying coefficients, adders 156 and 157, and a delay element 158. The adder 156 adds the signal data from the multiplier 151 and the signal data from the multiplier 154. The output data of the multiplier 156 is delayed by the delay element 158 for one sampling period, and in turn supplied to the multipliers 154 and 155. The adder circuit 157 adds the signal data from the adder 156 and the signal data from the multiplier 155, and the resulting summing signal is supplied to the circuit 153 as a filter output.

FIG. 9 shows a set of parallel processing instructions (an assembler program) for performing the operation of the circuitry shown in FIG. 8. The first processing instruction series shown in FIG. 9 is a series of instructions relating to the data bus 4, and the second processing instruction series is a series of operation instructions. In the first step, the signal data held in an input register (LIN1) in the interface 3 is transferred to a buffer memory (denoted by B in FIG. 9) 7 by a MOV instruction in the first processing instruction series. The transferred data is multiplied, at the multiplier 8, with coefficient data $D_1$ (corresponding to the coefficient of the multiplier 151 shown in FIG. 8) transferred to the buffer memory 9. The coefficient data are written in the RAM 10 in the order shown in FIG. 9, and each coefficient data is read-out from the RAM 10 at each step in accordance with the instruction signal from the sequence controller 18 and supplied to the buffer memory 9.

In the second step, data in an address $01 of the first signal data RAM 5 (DRAM 1) is read-out and transferred to the buffer memory (B) 7 by the MOV instruction in the first processing instruction series. At the same time, coefficient data $D_2$ is transferred from the RAM 10 to the buffer memory 9, and multiplied at the multiplier 8, with the signal data transferred to the buffer memory 7.

In the third step, data issued from the multiplier 8 by the MTL instruction in the second processing instruction series is held in the accumulator (denoted by D1 in FIG. 9) 12. In the case of the MTL instruction, the ALU 11 is in a state of allowing the output data of the multiplier 8 to pass through it. Further, the multiplier 8 is provided with a shifter (not shown) in its output stage, to perform a level control operation by the shift of bits. In the case of the third step, the result of multiplication by the data transfer performed in the first step is used. The signal data obtained by the third step described above corresponds to the output data of the multiplier 151 shown in FIG. 8. In the third step, at the same time, coefficient data $D_3$ is transferred from the RAM 10 to the buffer memory 9, and multiplied with the signal data transferred and held in the buffer memory 7 in the step 2 (the second step).

In the fourth step, the data issued from the multiplier 8 (corresponding to the output data of the multiplier 154 in FIG. 8) is added to the data held in the accumulator (D1) 12 by the MSM instruction in the second processing instruction series, and the resulting value is held in the accumulator (D1) 12. In this case, the data held in the accumulator 12 is relayed to the ALU 11. The data held in the accumulator (D1) 12 corresponds to the output data of the adder 156 in FIG. 8. In the fourth step also, the coefficient data $D_3$ is transferred from the RAM 10 to the buffer memory 9, and multiplied in the multiplier 8 with the signal data transferred and held in the buffer memory 7 in the step 2.

In the fifth step, the data issued from the multiplier 8 (corresponding to the output data of the multiplier 155 in FIG. 8) is added to the data held in the accumulator (D1) 12 by the MSM instruction in the second processing instruction series, and the resulting summing value is held in the accumulator (D1) 12. The data held in the accumulator 12 is supplied to the ALU 11. In this state, the signal data held in the accumulator (D1) 12 corresponds to the output data of the multiplier 157 in FIG. 8. In the fifth step also, the coefficient data $D_3$ is supplied from the RAM 10 to the buffer memory 9, and in turn multiplied, in the multiplier 8, with the signal data transferred and held in the buffer memory 7 in the step 2.

In the sixth step, the data held in the accumulator (D1) 12 by the MOV instruction in the first processing instruction series is transferred, through the data bus 4, to an address $00 of the signal data RAM (DRAM 1) 5 and the buffer memory (B) 7. This data is used as the input to the circuit 153. If a multiplier 159 for multiplying the coefficient is provided in the input stage of the circuit 153 as shown in FIG. 8, coefficient data $D_4$ (corresponding to the coefficient of the multiplier 159) is transferred from the RAM 10 to the buffer memory 9, and multiplied with the signal data transferred to the buffer memory 7 in the multiplier 8.

In the seventh step, data in an address $02 of the first data RAM (DRAM 1) 5, for example, is read-out by the MOV instruction of the first processing instruction series, and transferred to the buffer memory (B) 7. At the same time, coefficient data $D_5$ is transferred from the RAM 10 to the buffer memory 9, and multiplied in the multiplier 8 to the signal data transferred to the buffer memory 7.

As specifically described in the foregoing, when the product data issued from the multiplier 8 as multiplying means can be accepted by the output means such as the ALU 11 or the accumulator 12, the product data is used as the coefficient data of a new value, as in the steps 1, 2, 3, 6 and 7. However, if the product data output from the multiplier 8 is not accepted by the ALU 11 or the accumulator 12, data identical with the coefficient data of one step before is read-out, as in the steps 4 and 5. In this case, the multiplier 8 is in a state of maintaining the multiplying operation of one step before.

In the another embodiment of the audio signal data processing system according to the present invention described above, the same coefficient data is held in the coefficient memory in areas from which reading is performed during periods when the product data is not accepted to the output means. Therefore the same coefficient data is read-out and supplied to the multiplying means during such periods. Accordingly, the operation of the multiplying means does not change if the signal data supplied to the multiplying means remains unchanged. This means that the on-off operation of the multiplying means does not occur in such a state, so that the electric power consumption of the system can be reduced. Also, there is a further advantage that the undesired radiation from the system is reduced.

Figure 10:
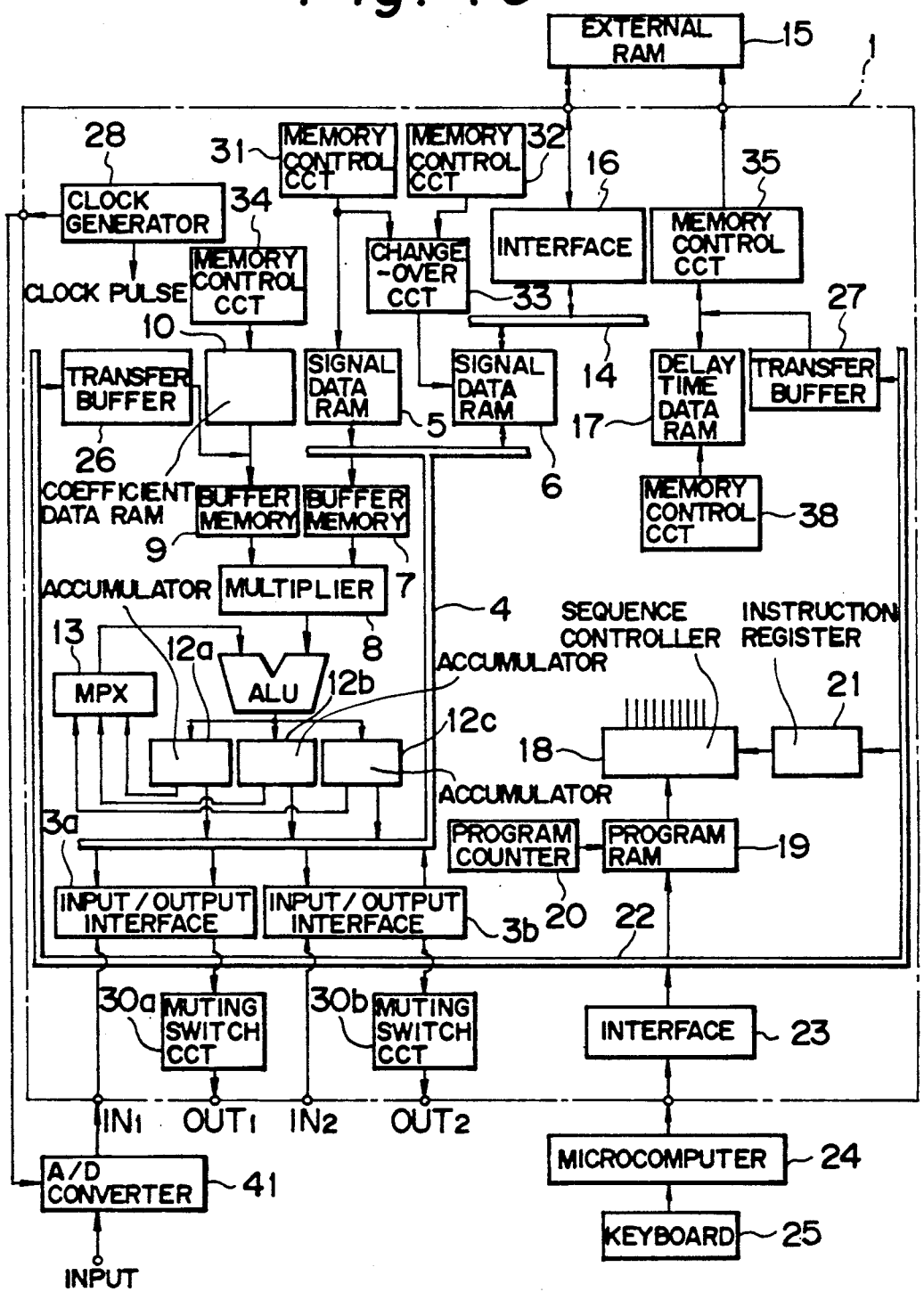
FIG. 10 is a block diagram showing a still further embodiment of the present invention.

The further embodiment of the present invention will be described with reference to FIGS. 10 through 12 of the accompanying drawings. In this embodiment, the audio signal data processing system is as shown in FIG. 10 constructed substantially the same as the system shown in FIG. 3, and explanation of same elements and corresponding parts will not be repeated. In this embodiment, however, an output signal of an MPX (multiplexer) 13 is connected to the other input of the ALU 11. In accordance with instruction signals supplied from the sequence controller 18 which will be described later, the MPX 13 selectively supplies, to the ALU 11, an output of one of three accumulators $12a$ through $12c$ for holding the calculation output of the ALU 11. The input audio signal is supplied to the input/output interface $3a$ through the A/D converter 41. Further, the clock pulses from the clock generator 28 are supplied to the A/D converter 41. In addition, the microcomputer 24 in this embodiment also performs the operation shown in the flowchart of FIG. 5.

Figures 11, 12:
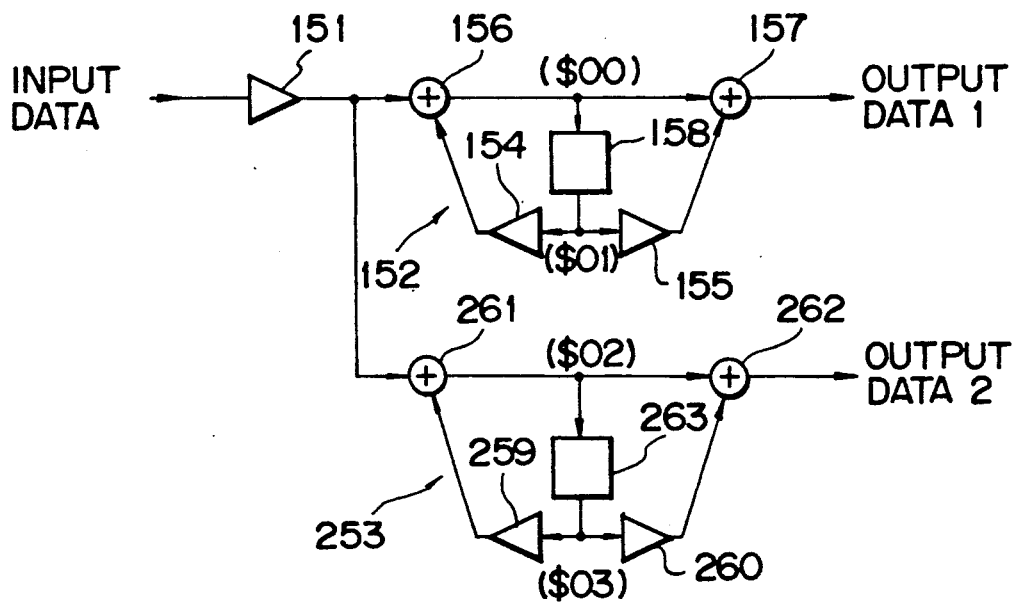
FIG. 11 is a circuit diagram showing processing operations of the system shown in FIG. 10.
FIG. 12 is a diagram showing a parallel processing instruction and coefficient data of each step for performing the operation of the circuit shown in FIG. 11.

This embodiment of the audio signal data processing system will be further described for a case in which a processing operation the same as that of a circuitry shown in FIG. 11 is performed.

In the circuitry shown in FIG. 11, input signal data is supplied to standard type first-order IIR filter circuits 152 and 253. From the standard type first-order IIR filter circuits 152 and 253, data are respectively forwarded. The first-order IIR filter circuit 152 comprises multipliers 154 and 155 for multiplying coefficients, adders 156 and 157, and a delay element 158. The adder 156 adds the signal data from the multiplier 151 and the signal data from the multiplier 154. The output data of the multiplier 156 is delayed by the delay element 158 for one sampling period, and in turn supplied to the multipliers 154 and 155. The adder circuit 157 adds the signal data from the adder 156 and the signal data from the multiplier 155, and the resulting summing signal is issued as a filter output. The first-order IIR filter circuit 253 comprises, like the first-order IIR filter circuit 152, multipliers 259 and 260, adders 261 and 262, and a delay elements 263.

FIG. 12 shows a set of parallel processing instructions (an assembler program) for performing the operation of the circuitry shown in FIG. 11. The first processing instruction series shown in FIG. 12 is a series of instructions relating to the data bus 4, and the second processing instruction series is a series of operation instructions. In the first step, the signal data held in an input register (LIN1) in the interface $3a$ is transferred to a buffer memory (denoted by B in FIG. 12) 7 by a MOV instruction in the first processing instruction series. The transferred data is multiplied, at the multiplier 8, with coefficient data transferred to the buffer memory 9. The coefficient data is sequentially read-out from the RAM 10 at each step in accordance with the instruction signal from the sequence controller 18 and supplied to the buffer memory 9.

In the second step, data in an off-set address $01 of the first signal data RAM 5 (DRAM 1) is read-out and transferred to the buffer memory (B) 7 by the MOV instruction in the first processing instruction series.

In the third step, data issued from the multiplier 8 by the MTL instruction in the second processing instruction series is held in the accumulator (denoted by D1 in FIG. 12) $12a$. In the case of the MTL instruction, the ALU 11 is in a state of allowing the output data of the multiplier 8 to pass through it. Further, the multiplier 8 is provided with a shifter (not shown) in its output stage, and the data issued from the multiplier 8 becomes a result of multiplication by the data transferred to the buffer memory (B) 7 and the buffer memory 9 two steps before. In the case of the third step, data issued from the multiplier 8 is the result of multiplication by the data transfer performed in the first step. The signal data obtained by the third step described above corresponds to the output data of the multiplier 151 shown in FIG. 11.

In the fourth step, data in an off-set address $03 of the first signal data RAM (DRAM 1) 5 is read-out and transferred to the buffer memory (B) 7 by the MOV instruction in the first processing instruction series. At the same time, the data issued from the multiplier 8 (corresponding to the output data of the multiplier 154 in FIG. 11) is added to the data held in the accumulator (D1) 12a by the MSM instruction in the second processing instruction series, and the resulting value is held in the accumulator (D2) 12b. In this case, the data held in the accumulator (D2) 12b corresponds to the output data of the adder 156 in FIG. 11

In the fifth step, the data held in the accumulator (D2) 12b is transferred through the data bus 4 to an off-set address $00 of the first signal data RAM (DRAM 1) 5 and written therein by the MOV instruction in the first processing instruction series. Also, the data issued from the multiplier 8 (corresponding to the output data of the multiplier 155 in FIG. 11) is added to the data held in the accumulator (D2) 12b by the MSM instruction in the second processing instruction series, and the resulting summing value is held in the accumulator (D2) 12b. In this case, the MPX 13 relays the data held in the accumulator 12b to the ALU 11. In this state, the signal data held in the accumulator (D2) 12b corresponds to the output data of the multiplier 157 in FIG. 11.

In the sixth step, the data held in the accumulator (D2) 12b by the MOV instruction in the first processing instruction series is transferred to a output register (L01) in the interface 3a. Further, the data issued from the multiplier 8 (corresponding to the output data of the multiplier 259 in FIG. 11) is added to the data held in the accumulator (D1) 12a by the MSM instruction in the second processing instruction series, and the summing value is held in the accumulator (D1) 12a. In this case, the MPX 13 relays the data held in the accumulator 12a to the ALU 11. The data held in the accumulator (D1) 12a corresponds to the output data of the adder 261 in FIG. 11.

In the seventh step, the data held in the accumulator (D1) 12a is transferred through the data bus 4 written into an off-set address $02 of the first data RAM (DRAM 1) 5 by the MOV instruction in the first processing instruction series. At the same time, the data issued from the multiplier 8 (corresponding to the output data of the multiplier 260 in FIG. 11) is added to the data held in the accumulator (D1) 12a by the MSM instruction in the second processing instruction series, and the result of addition is held in the accumulator (D1) 12a. In this case, the MPX 13 relays the data held in the accumulator 12a to the ALU 11. The signal data held in the accumulator (D1) 12a corresponds to the output data of the adder 262 in FIG. 11.

In the eighth step, the data held in the accumulator (D1) 12a is transferred to the output register (L02) in the interface 3b by the MOV instruction in the first processing instruction series.

In the way described above, the data calculated in the third step is held in the accumulator (D1) 12a so that the data is again used in the operation in the fifth step. Furthermore, the data held in the accumulator (D1) 12a is used in the operation of the fourth step, and a result of operation is held in the accumulator (D2) 12b.

As specifically described in the foregoing, in the further embodiment of the audio signal data processing system according to the present invention, the present value of the result obtained by the operation of arithmetic means is supplied to a plurality of accumulators for holding supplied data except at least one of the accumulators, the next value of the result of operation is supplied to the at least one of the accumulators, and data held in the accumulators other than the at least one of accumulators is supplied to the arithmetic means. Therefore, when data of a result of operation is used for other plurality of operations as in the embodiment described above, the data of the result of operation is held in one of accumulators, and other results of operations using the held data ca be held in other accumulators. By this feature, it is made unnecessary to temporarily store a result of operation into the data memory or to repeat the same operation a plurality of times, so that the number of programs steps can be reduced especially when a complex operating process is performed. Thus, the total execution time of the system can be reduced according to the present invention.

What is claimed is:

1. An audio signal data processing system comprising:
first processing means for processing audio signal data;
second processing means for processing audio signal data, said first and second processing means having input and output ports of at least two channels; and
control means for controlling the operation of said first and second processing means, wherein an input audio signal data is supplied to the input port of one channel of each of said first and second processing means, and output data from the output port of said one channel of said first processing means is supplied to the input port of the other channel of said second processing means, and output audio signal data are obtained at each output port of both channels of said second processing means.

2. An audio signal data processing system as claimed in claim 1, wherein said second processing means produces a data passing state between said input port and said output port of said other channel in response to an instruction signal.

3. An audio signal data processing system as claimed in claim 1, wherein said one and other channels of said first processing means respectively have same functions as said one and other channels of said second processing means.

4. An audio signal data processing system comprising:
input means for sequentially supplying audio signal data;
data memory control means for writing and reading-out the audio signal data into and from a data memory;
a coefficient memory for storing coefficient data;
a coefficient memory control means for sequentially reading-out the coefficient data from the coefficient memory;
multiplying means for multiplying the read-out audio signal data with the coefficient data; and
output means for accepting product data obtained by a multiplying operation of the multiplying means and forwarding audio signal data corresponding to the product data in accordance with reading operations of the data memory control means and coefficient memory control means;
wherein identical coefficient data is stored in consecutive memory locations of said coefficient memory through which reading is performed during a period when the product data is not accepted by the output means.

5. An audio signal data processing system comprising:
input means for sequentially supplying audio signal data;

data memory control means for writing and reading-out the audio signal data into and from a data memory;

arithmetic means for multiplying the read-out audio signal data with predetermined coefficient data;

holding means for accepting accumulation data as a result of operation of said arithmetic means and for holding said accumulation data;

relaying means for supplying data held in said holding means to said arithmetic means for a next accumulating operation; and output means for forwarding signal data corresponding to the data held in the holding means, wherein the holding means includes a plurality of accumulators for holding data and selecting means for supplying a present value of said accumulation data to said plurality of accumulators except at least one of accumulators and supplying a next value of said accumulation data to said at least one of the accumulators, and wherein said relaying means supplies data held in said plurality of accumulators other than said at least one of accumulators to said arithmetic means.

* * * * *